US012528248B2

(12) United States Patent
Tashiro

(10) Patent No.: US 12,528,248 B2
(45) Date of Patent: Jan. 20, 2026

(54) THREE-DIMENSIONAL MOLDING SYSTEM

(71) Applicant: SEIKO EPSON CORPORATION, Tokyo (JP)

(72) Inventor: Takumi Tashiro, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 339 days.

(21) Appl. No.: 18/172,405

(22) Filed: Feb. 22, 2023

(65) Prior Publication Data

US 2023/0264426 A1 Aug. 24, 2023

(30) Foreign Application Priority Data

Feb. 24, 2022 (JP) ................... 2022-026353

(51) Int. Cl.
*B29C 64/20* (2017.01)
*B29C 64/118* (2017.01)
(Continued)

(52) U.S. Cl.
CPC ............ *B29C 64/20* (2017.08); *B29C 64/182* (2017.08); *B29C 64/393* (2017.08); *B33Y 50/02* (2014.12); *B29C 64/118* (2017.08); *B33Y 30/00* (2014.12)

(58) Field of Classification Search
CPC ..... B29C 64/20; B29C 64/118; B29C 64/182; B29C 64/295; B29C 64/393; B33Y 50/02;
(Continued)

(56) References Cited

U.S. PATENT DOCUMENTS

2012/0092724 A1* 4/2012 Pettis ................... B33Y 50/00
358/1.15
2015/0177158 A1* 6/2015 Cheverton ............ B29C 64/393
700/119
(Continued)

FOREIGN PATENT DOCUMENTS

JP 2015-507250 A 3/2015
JP 2017-177574 A 10/2017
(Continued)

*Primary Examiner* — Jerzi H Moreno Hernandez
(74) *Attorney, Agent, or Firm* — Global IP Counselors, LLP

(57) ABSTRACT

A three-dimensional molding system includes: an ejection unit including a nozzle; a stage including a molding surface and on which the molding material is laminated; a position changing unit configured to change relative positions of the stage and the nozzle; a camera disposed outside an outer edge of the molding surface when viewed from a direction perpendicular to the molding surface, and at a position where the entire molding surface is imaged; a control unit configured to mold a three-dimensional molded object based on molding data; and a display unit including a first display area configured to display an image or a moving image captured by the camera, and a second display area configured to display at least one of a molding condition for molding the three-dimensional molded object and a device state representing a state of the ejection unit. The control unit selects, for each three-dimensional molded object, one of a first state in which the image or the moving image is displayed in the first display area and a second state in which the image or the moving image is not displayed in the first display area.

11 Claims, 15 Drawing Sheets

(51) Int. Cl.
    *B29C 64/182*    (2017.01)
    *B29C 64/295*    (2017.01)
    *B29C 64/393*    (2017.01)
    *B33Y 30/00*     (2015.01)
    *B33Y 50/02*     (2015.01)

(58) Field of Classification Search
    CPC ............... B33Y 30/00; G05B 19/4099; G05B 2219/49023
    See application file for complete search history.

(56) References Cited

U.S. PATENT DOCUMENTS

| | | | |
|---|---|---|---|
| 2016/0375640 A1* | 12/2016 | Cho | ..................... B29C 64/393 |
| | | | 425/141 |
| 2017/0173888 A1 | 6/2017 | Thomas-Lepore et al. | |
| 2017/0173889 A1 | 6/2017 | Thomas-Lepore et al. | |
| 2017/0285616 A1 | 10/2017 | Kaneko | |
| 2022/0161501 A1 | 5/2022 | Ishikura | |
| 2022/0324176 A1* | 10/2022 | Endo | ..................... B29C 64/393 |

FOREIGN PATENT DOCUMENTS

| | | |
|---|---|---|
| JP | 2022-084040 A | 6/2022 |
| WO | 2013/086309 A1 | 6/2013 |

\* cited by examiner

FIG. 2

| USER INFORMATION | CAMERA DISPLAY SETTING | UPDATE INTERVAL | NOTIFICATION SETTING | MOLDED OBJECT ID |
|---|---|---|---|---|
| USER A | ON | 60 SECONDS | OFF | MD1, MD2 |
| USER B | OFF | 10 SECONDS | OFF | MD3 |
| USER C | OFF | 1 HOUR | ON | MD4 |
| USER D | ON | 2 SECONDS | ON | MD5, MD6 |

CAMERA IMAGE

| MATERIALS USED | MODEL | SUPPORT |
|---|---|---|
| | ABS | PC |
| CUMULATIVE EJECTION AMOUNT | 250mm³ | 10mm³ |

OPERATIONAL BASIC INFORMATION

DEVICE NAME : 3DP_001
MODEL NAME : E_3DP
ID (SERIAL NUMBER) : T0000000001
SOFTWARE VERSION : 1.10
OPERATING STATUS : DURING MOLDING
LIST OF MATERIALS USED : PC, ABS, ...

| | MEASURED VALUE | SET VALUE |
|---|---|---|
| MATERIAL HEATER TEMPERATURE | 252 (°C) | 250 (°C) |
| STAGE HEATER TEMPERATURE | 194 (°C) | 200 (°C) |
| UPPER HEATER TEMPERATURE | 200 (°C) | 200 (°C) |
| UPPERMOST LAYER TEMPERATURE | 175 (°C) | 180 (°C) |
| PRESSURE | 20 (MPa) | 20 (MPa) |
| RAW MATERIAL REMAINING AMOUNT | 80% | |

AR2

FIG. 10
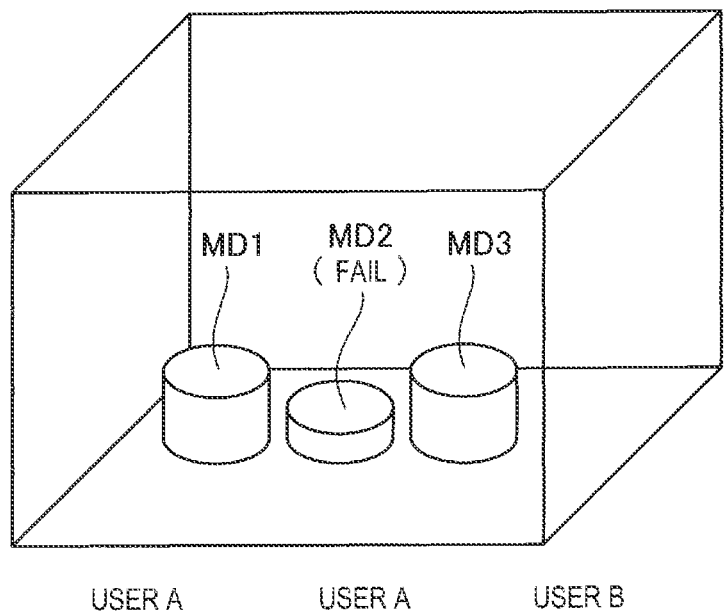
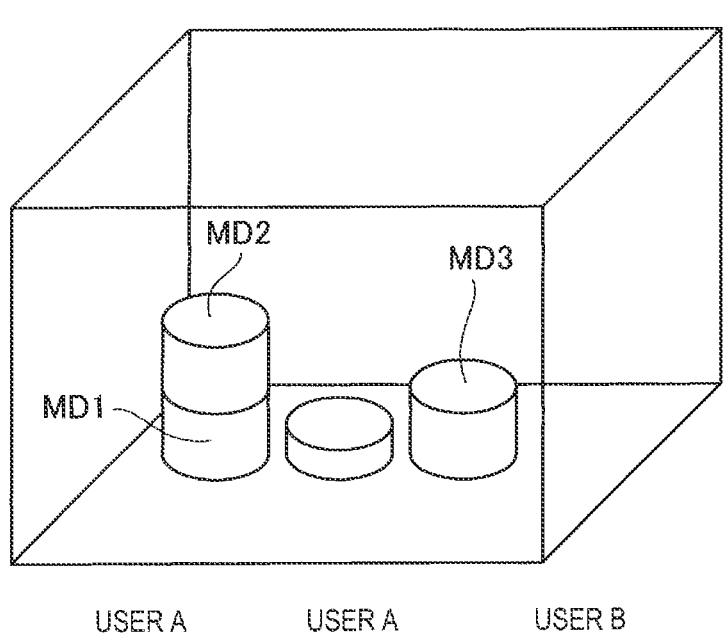

FIG. 11
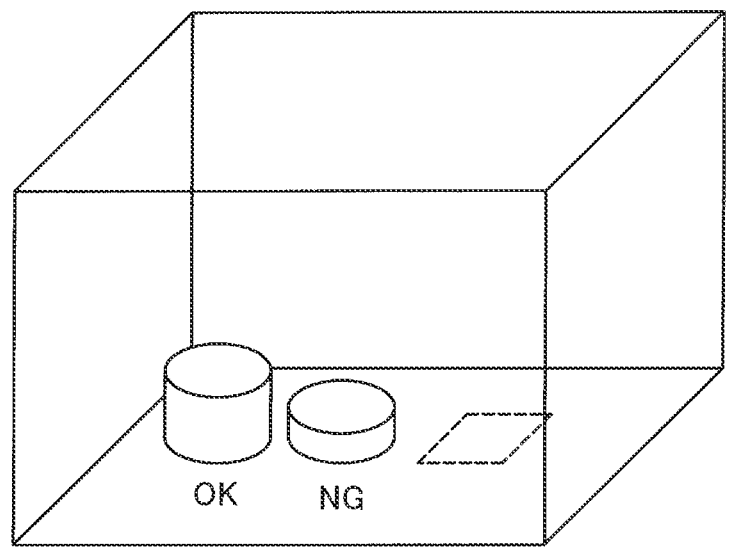
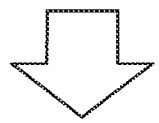
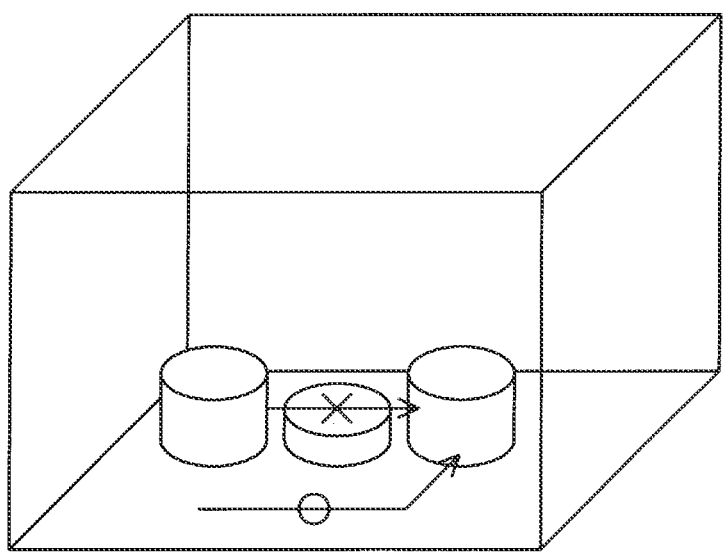

THREE-DIMENSIONAL MOLDING SYSTEM

The present application is based on, and claims priority from JP Application Serial Number 2022-026353, filed on Feb. 24, 2022, the disclosure of which is hereby incorporated by reference herein in its entirety.

BACKGROUND

1. Technical Field

The present disclosure relates to a three-dimensional molding system.

2. Related Art

JP-T-2015-507250 discloses a three-dimensional molding device including a video camera. The three-dimensional molding device captures, by the video camera, an image of a molded object during molding, and transmits the image to a distant place.

In the above art, useful information can be provided to a user at the distant place, but the image captured by the video camera may be confirmed by other users, and for example, information on a confidential component during molding may leak to other users. Therefore, there is a demand for a technique capable of providing useful information to a user and preventing leakage of information to other users.

SUMMARY

The present disclosure can be implemented in the following aspect.

According to a first aspect of the present disclosure, a three-dimensional molding system is provided. The three-dimensional molding system includes: an ejection unit including a nozzle configured to eject a molding material; a stage including a molding surface and on which the molding material is laminated; a position changing unit configured to change relative positions of the stage and the nozzle; a camera disposed outside an outer edge of the molding surface when viewed from a direction perpendicular to the molding surface, and at a position where the entire molding surface is imaged; a control unit configured to mold a three-dimensional molded object by controlling the ejection unit and the position changing unit based on molding data; and a display unit including a first display area configured to display an image or a moving image captured by the camera, and a second display area configured to display at least one of a molding condition for molding the three-dimensional molded object and a device state representing a state of the ejection unit during molding of the three-dimensional molded object. The control unit selects, for each three-dimensional molded object, one of a first state in which the image or the moving image is displayed in the first display area and a second state in which the image or the moving image is not displayed in the first display area.

BRIEF DESCRIPTION OF THE DRAWINGS

FIG. 2 is a diagram showing an example of a setting database stored in a storage unit.

FIG. 6 is a diagram showing an example of display contents displayed on a display unit.

FIG. 10 is a diagram illustrating the remolding processing.

FIG. 11 is a diagram showing correction of molding data.

DESCRIPTION OF EXEMPLARY EMBODIMENTS

A. First Embodiment

Figure 1:
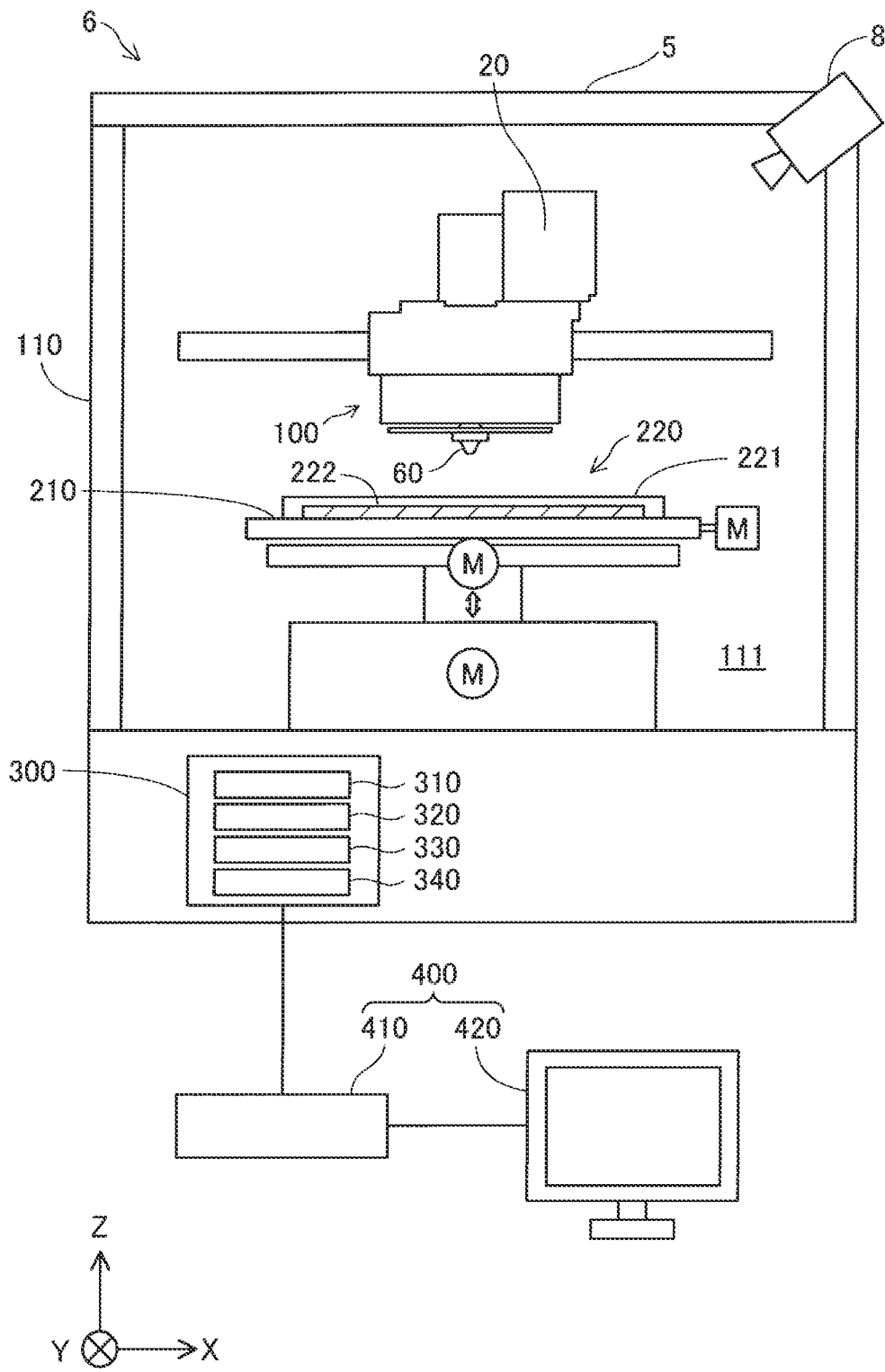
FIG. 1 is a diagram showing a schematic configuration of a three-dimensional molding system according to a first embodiment.

FIG. 1 is a diagram showing a schematic configuration of a three-dimensional molding system 6 including a three-dimensional molding device 5 according to a first embodiment. The three-dimensional molding system 6 includes the three-dimensional molding device 5 and a display device 400. FIG. 1 shows arrows along X, Y, and Z directions orthogonal to each other. The X, Y, and Z directions are directions along an X axis, a Y axis, and a Z axis, which are three spatial axes orthogonal to each other, and each includes both a direction on one side and an opposite direction thereto along the X axis, the Y axis, or the Z axis. The X axis and the Y axis are axes along a horizontal plane, and the Z axis is an axis along a vertical line. In other drawings, arrows along the X, Y, and Z directions are also shown as appropriate. The X, Y, and Z directions in FIG. 1 and the X, Y, and Z directions in other drawings represent the same directions.

The three-dimensional molding device 5 according to the embodiment includes an ejection unit 100, a material accommodation unit 20, a chamber 110, a position changing unit 210, a stage 220, and a control unit 300.

The ejection unit 100 includes a plasticization mechanism that plasticizes at least a part of a raw material supplied from the material accommodation unit 20 to generate a molding material. The ejection unit 100 ejects the plasticized molding material toward a molding surface 221 of the stage 220. The molding surface 221 is an area of an upper surface of the stage 220. The stage 220 is provided with a stage heater 222 that prevents rapid cooling of the molding material ejected to the molding surface 221. The stage heater 222 is controlled by the control unit 300.

The chamber 110 is a housing that has a molding space 111 therein and accommodates a part of the three-dimensional molding device 5. In the embodiment, the molding space 111 accommodates the material accommodation unit 20, the ejection unit 100, the position changing unit 210, and the stage 220. The chamber 110 may be provided with, for example, an opening through which the molding space 111 communicates with the outside, and a door that opens and closes the opening. In this case, a user can take out a molded object in the chamber 110 from the opening by opening the door to open the opening.

The position changing unit 210 moves a nozzle tip 60 relative to the stage 220 by changing relative positions of the ejection unit 100 and the stage 220. A change in the relative position of the ejection unit 100 with respect to the stage 220 may be simply referred to as movement of the ejection unit 100 or the nozzle tip 60. The nozzle tip 60 is also simply referred to as a nozzle. The position changing unit 210 according to the embodiment is implemented by a three-axis positioner that moves the stage 220 in three axial directions including the X, Y, and Z directions by driving forces of three motors. Each motor is driven under control of the control unit 300. In other embodiments, instead of moving the stage 220, the position changing unit 210 may move the ejection unit 100 without moving the stage 220, for example. The position changing unit 210 may move both the stage 220 and the ejection unit 100.

The control unit 300 is implemented by a computer including a processor 310, a memory 320, a storage unit 330 as an auxiliary storage device, and an input and output interface 340 that receives signals from the outside and outputs signals to the outside. In the embodiment, the control unit 300 causes the processor 310 to execute a program read from the storage unit 330 into the memory 320, thereby controlling the ejection unit 100 and the position changing unit 210 to execute three-dimensional molding processing based on molding data for molding a three-dimensional molded object. The control unit 300 can simultaneously molding a plurality of molded objects on the molding surface 221 of the stage 220 by controlling the ejection unit 100 and the position changing unit 210. The control unit 300 may be implemented by a combination of a plurality of circuits instead of the computer. Hereinafter, the three-dimensional molded object is also simply referred to as a molded object.

The molding data for molding the molded object includes, for each layer obtained by slicing a shape of the molded object into a plurality of layers, path information indicating a movement path of the nozzle tip 60 and ejection amount information indicating an ejection amount of the molding material in each movement path. The movement path of the nozzle tip 60 is a path along which the nozzle tip 60 relatively moves along the molding surface 221 of the stage 220 while ejecting the molding material.

The path information includes a plurality of partial paths. Each partial path is a linear path represented by a start point and an end point. The ejection amount information is individually associated with each partial path. In the embodiment, the ejection amount represented by the ejection amount information is an amount of the molding material ejected per time unit in the partial path. In other embodiments, a total amount of the molding material ejected in the entire partial path may be associated with each partial path as the ejection amount information. When a plurality of molded objects are molded on the molding surface 221 of the stage 220, the molding data may be prepared for each molded object, or the plurality of molded objects may be molded according to one piece of molding data.

The three-dimensional molding device 5 further includes a camera 8. The camera 8 can image the molding surface 221 on the stage 220. The camera 8 is disposed outside an outer edge of the molding surface 221 when viewed from a direction perpendicular to the molding surface 221, and at a position where the entire molding surface 221 can be imaged. The camera 8 is controlled by the control unit 300. The control unit 300 can capture, by controlling the camera 8, an image or a moving image of the three-dimensional molded object molded on the molding surface 221. Hereinafter, the image and the moving image are collectively referred to as an "image". In the embodiment, the camera 8 is constantly started while the three-dimensional molding device 5 is started. That is, the camera 8 constantly captures the image while the three-dimensional molding device 5 is started.

An external display device 400 is coupled to the control unit 300. The display device 400 includes a computer 410 and a display unit 420. For example, a liquid crystal display or an organic EL display is used as the display unit 420. The computer 410 and the display unit 420 may be separated from each other or integrated with each other. In the embodiment, the control unit 300 and the computer 410 are coupled by a network. The network may be any of a LAN, a WAN, and the Internet. The computer 410 has a function of transmitting the molding data for molding the three-dimensional molded object to the three-dimensional molding device 5. The control unit 300 of the three-dimensional molding device 5 receives the molding data from the computer 410 and performs three-dimensional molding based on the received molding data. A process in which the control unit 300 molds one or more three-dimensional molded objects on one molding surface 221 according to one or more pieces of molding data is referred to as a "print job". The display device 400 is not limited to a combination of the computer 410 and the display unit 420, and may be a notebook computer, a mobile terminal, or a tablet device. Although FIG. 1 shows one display device 400, a plurality of display devices 400 of different users may be coupled to the three-dimensional molding device 5 via a network.

The computer 410 acquires, from the user, various types of setting information such as setting information indicating whether an image captured by the camera 8 provided in the three-dimensional molding device 5 is to be displayed on the display device 400. The user can input the setting information by using a predetermined graphical user interface displayed on the display unit 420, for example. The control unit 300 of the three-dimensional molding device 5 acquires the setting information from the computer 410 and records the setting information in a setting database DB1 in the storage unit 330.

FIG. 2 is a diagram showing an example of the setting database DB1 stored in the storage unit 330. In the setting database DB1, "user information", "camera display setting", "update interval", "notification setting", and "molded object ID" are recorded in association with each other.

The "user information" is identification information for uniquely identifying a user who uses the three-dimensional molding device 5.

The "camera display setting" is setting information indicating whether an image captured by the camera 8 is displayed on the display device 400.

The "update interval" is setting information indicating a display interval at which the display device 400 displays the image captured by the camera 8.

The "notification setting" is setting information indicating whether to notify the user of a failure when molding of the three-dimensional molded object fails.

The "update interval" and the "notification setting" are set using a predetermined graphical user interface displayed on the display unit 420 of the display device 400, similarly to the "camera display setting".

The "molded object ID" is identification information assigned to each molded object. The molded object ID may be represented by a file name of molding data or a name of a folder in which molding data is stored. When the user simultaneously molds a plurality of molded objects, a plurality of molded object IDs are associated with the user information corresponding to the user.

In the embodiment, the above-described various types of setting information are set in the setting database DB1 for each print job. In other embodiments, the camera display setting, the update interval, and the notification setting may be set for each user or for each piece of molding data.

The control unit 300 can set whether to display an image captured by the camera 8 on the external display device 400 during at least one of periods before starting molding of the three-dimensional molded object, during molding of the three-dimensional molded object, and after molding of the three-dimensional molded object. Specifically, the control unit 300 refers to the "camera display setting" in the setting database DB1 shown in FIG. 2 to select, for each three-dimensional molded object, one of a first state in which an image is displayed on the display device 400 and a second state in which an image is not displayed on the display device 400. "Each three-dimensional molded object" includes a meaning of each three-dimensional molded object associated with a specific user, that is, "each user", and also includes a meaning of "each piece of molding data" for molding a three-dimensional molded object. In the embodiment, the control unit 300 selects the first state or the second state described above by selecting whether to transmit the image to the display device 400 according to the camera display setting. In the first state in which the image is displayed on the display device 400, the control unit 300 controls an interval at which the image is transmitted according to the update interval recorded in the setting database DB1.

Figure 3:
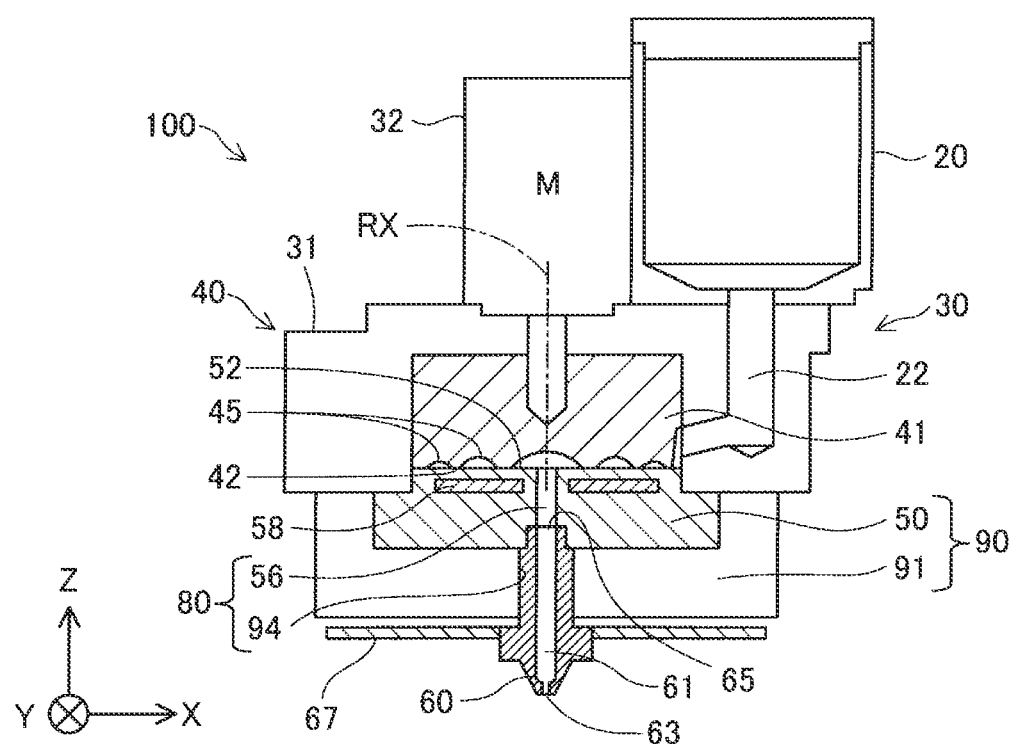
FIG. 3 is a diagram showing a schematic configuration of an ejection unit.

FIG. 3 is a diagram showing a schematic configuration of the ejection unit 100 according to the embodiment. The ejection unit 100 includes a plasticization mechanism 30 and the nozzle tip 60. The plasticization mechanism 30 includes a material conveyance mechanism 40 and a heating block 90. The material accommodated in the material accommodation unit 20 is supplied to the ejection unit 100. Under the control of the control unit 300, the ejection unit 100 plasticizes at least a part of the material supplied from the material accommodation unit 20 by the plasticization mechanism 30 to generate the molding material, and ejects the generated molding material from the nozzle tip 60 onto the stage 220 to laminate the molding material. The material laminated on the stage 220 may be referred to as a laminated material. A three-dimensional molding method in which a material is ejected from a nozzle and the ejected material is laminated to mold a three-dimensional molded object may be referred to as a material extrusion (ME) method.

In the embodiment, "plasticization" is a concept including melting, and means changing from a solid state to a flowable state. Specifically, for a material in which glass transition occurs, plasticization is to set a temperature of the material to be equal to or higher than a glass transition point. For a material in which glass transition does not occur, plasticization is to set a temperature of the material to be equal to or higher than a melting point.

The material accommodation unit 20 according to the embodiment accommodates the material in a form of pellets, powder, or the like. In the embodiment, the material accommodated in the material accommodation unit 20 is a pelletized resin. The material accommodation unit 20 according to the embodiment is implemented by a hopper. The material accommodated in the material accommodation unit 20 is supplied to the material conveyance mechanism 40 of the plasticization mechanism 30 of the ejection unit 100 via a supply path 22 provided below the material accommodation unit 20 so as to couple the material accommodation unit 20 and the ejection unit 100.

The heating block 90 has a through hole 80. The through hole 80 is formed such that the nozzle tip 60 can be attached to and detached from the through hole 80. The material conveyance mechanism 40 conveys the material toward a nozzle flow path 61 of the nozzle tip 60 attached to the through hole 80 of the heating block 90. The plasticization mechanism 30 conveys, by the material conveyance mechanism 40, the raw material supplied from the material accommodation unit 20 to the material conveyance mechanism 40 toward the nozzle flow path 61 of the nozzle tip 60, and heats and plasticizes the raw material by a material heater 58 provided in the heating block 90. The material heater 58 is controlled by the control unit 300.

The material conveyance mechanism 40 according to the embodiment includes a screw case 31, a screw 41 accommodated in the screw case 31, and a drive motor 32 that drives the screw 41. The heating block 90 according to the embodiment includes a case portion 91 having an opening 94, and a barrel 50 provided in the case portion 91. The barrel 50 has a communication hole 56. The through hole 80 according to the embodiment is formed by the opening 94 and the communication hole 56 communicating with each other. The material heater 58 described above is built in the barrel 50. The screw 41 according to the embodiment is a so-called flat screw, and may be referred to as "scroll".

The screw 41 has a substantially cylindrical shape in which a height in a direction along a central axis RX is smaller than a diameter. The screw 41 includes a groove forming surface 42 in which a screw groove 45 is formed in a surface facing the barrel 50. The groove forming surface 42 faces a screw facing surface 52 of the barrel 50 to be described later. The central axis RX according to the embodiment coincides with a rotation axis of the screw 41. A configuration of the screw 41 on a groove forming surface 42 side will be described in detail later.

The drive motor 32 is coupled to a surface of the screw 41 opposite to the groove forming surface 42. The drive motor 32 is driven under the control of the control unit 300. The screw 41 is rotated about the central axis RX by a torque generated by rotation of the drive motor 32. The drive motor 32 may not be directly coupled to the screw 41, and may be coupled via a speed reducer, for example.

The barrel 50 has the screw facing surface 52 facing the groove forming surface 42 of the screw 41. The case portion 91 covers a surface of the barrel 50 opposite to the screw facing surface 52, that is, a lower surface of the barrel 50. The communication hole 56 and the opening 94 described above are formed at positions overlapping the central axis RX of the screw 41. That is, the through hole 80 is located at a position overlapping the central axis RX.

As described above, the nozzle tip 60 is detachably attached to the through hole 80 of the heating block 90. The nozzle tip 60 is provided with the nozzle flow path 61 described above. The nozzle flow path 61 has a nozzle opening 63 at a front end of the nozzle tip 60, and has an inflow port 65 at a rear end of the nozzle tip 60. In the embodiment, the nozzle opening 63 is located at a position in a −Z direction of the inflow port 65. The nozzle tip 60 according to the embodiment ejects, from the nozzle opening 63 toward the stage 220, the material flowed into the nozzle flow path 61 via the through hole 80 and the inflow port 65.

A plate-shaped upper heater 67 is attached to the nozzle tip 60. The upper heater 67 is disposed above the nozzle opening 63 in the ejection unit 100. The upper heater 67 heats the molding material ejected toward the molding surface 221 of the stage 220. More specifically, when the molding material is ejected from the nozzle opening 63, the upper heater 67 heats an upper layer in layers laminated on the molding surface 221 of the stage 220. Adhesion between the layers can be increased by heating the upper layer by the upper heater 67. The upper heater 67 is controlled by the control unit 300.

Figure 4:
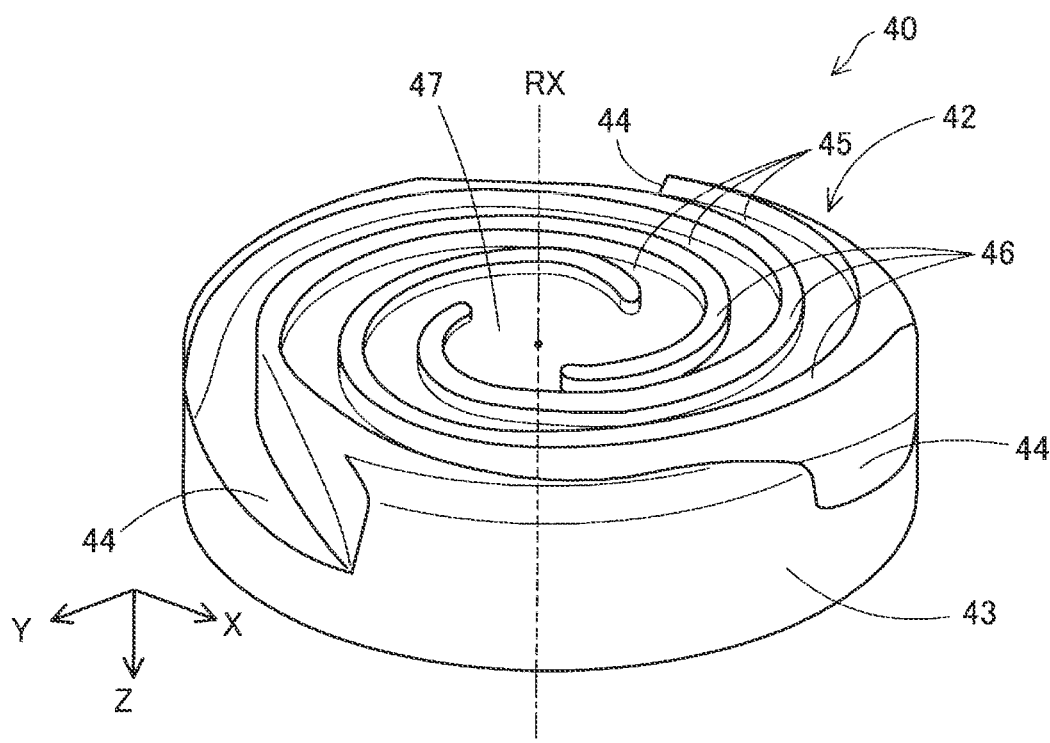
FIG. 4 is a schematic perspective view of a screw.

FIG. 4 is a schematic perspective view showing the configuration of the screw 41 on the groove forming surface 42 side. In FIG. 4, a position of the central axis RX of the screw 41 is indicated by a one-dot chain line. As described above, the screw groove 45 is formed in the groove forming surface 42. A screw central portion 47, which is a central portion of the groove forming surface 42 of the screw 41, is formed as a recess coupled to one end of the screw groove 45. The screw central portion 47 faces the communication hole 56 of the barrel 50 shown in FIG. 1. The screw central portion 47 intersects the central axis RX.

The screw groove 45 of the screw 41 is a so-called scroll groove. The screw groove 45 extends spirally from the screw central portion 47 toward an outer periphery of the screw 41 in an arc. The screw groove 45 may extend in an involute curve shape or a spiral shape. The groove forming surface 42 includes ridge portions 46 that are side wall portions of each screw groove 45 and extend along the screw groove 45. The screw groove 45 is continuous to a material introduction port 44 formed in a side surface 43 of the screw 41. The material introduction port 44 is a portion that receives the material supplied via the supply path 22 of the material accommodation unit 20.

FIG. 4 shows an example of the screw 41 having three screw grooves 45 and three ridge portions 46. The number of the screw grooves 45 and the ridge portions 46 formed in the screw 41 is not limited to three, and only one screw groove 45 may be provided, or two or more screw grooves 45 may be provided. In addition, FIG. 4 shows the example of the screw 41 in which the material introduction ports 44 are formed at three positions. The number of the material introduction ports 44 provided in the screw 41 is not limited to three, and the material introduction ports 44 may be provided only at one position or at two or more positions.

Figure 5:
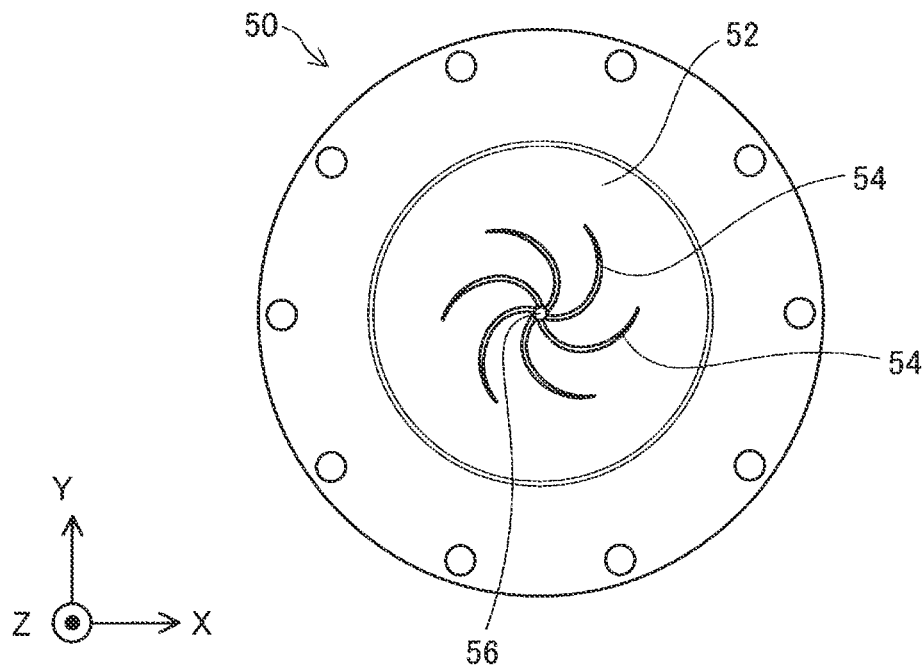
FIG. 5 is a top view of a barrel.

FIG. 5 is a top view showing a configuration of the barrel 50 on a screw facing surface 52 side. As described above, the communication hole 56 is formed in a center of the screw facing surface 52. A plurality of guide grooves 54 are formed around the communication hole 56 in the screw facing surface 52. Each of the guide grooves 54 has one end coupled to the communication hole 56 and extends spirally from the communication hole 56 toward an outer periphery of the screw facing surface 52. Each of the guide grooves 54 has a function of guiding the molding material to the communication hole 56. The one end of the guide groove 54 may not be coupled to the communication hole 56. The guide groove 54 may not be formed in the barrel 50.

FIG. 6 is a diagram showing an example of display contents displayed on the display unit 420. The display unit 420 includes a first display area AR1 and a second display area AR2.

The first display area AR1 is an area where the image captured by the camera 8 can be displayed. When receiving the image captured by the camera 8 from the control unit 300, the computer 410 displays the image in the first display area AR1.

The second display area AR2 is an area where various types of information transmitted from the control unit 300 can be displayed. In the embodiment, at least one of a molding condition for molding the three-dimensional molded object and a device state representing a state of the ejection unit 100 during molding of the three-dimensional molded object is displayed in the second display area AR2.

For example, a condition related to the molding material to be ejected by the ejection unit 100, a condition related to a temperature of the material heater 58, a condition related to a temperature of the stage heater 222, and a condition related to a temperature of the upper heater 67 are displayed in the second display area AR2 as the molding condition for molding the three-dimensional molded object. The condition related to the molding material is, for example, a name of the molding material such as acrylonitrile-butadiene-styrene (ABS) or polycarbonate (PC). The condition related to the temperature of the material heater 58 is, for example, a temperature of the material heater 58 set by the control unit 300. The condition related to the temperature of the stage heater 222 is, for example, a temperature of the stage heater 222 set by the control unit 300. The condition related to the temperature of the upper heater 67 is, for example, a temperature of the upper heater 67 set by the control unit 300.

For example, at least one of a state related to a cumulative ejection amount of the ejection unit 100 and a state related to a temperature of the material heater 58 provided in the ejection unit 100 is displayed in the second display area AR2 as the device state representing the state of the ejection unit 100 during the molding of the three-dimensional molded object. The cumulative ejection amount of the ejection unit 100 is calculated based on the molding data for molding the three-dimensional molded object, for example. The state related to the temperature of the material heater 58 represents, for example, a temperature of the material heater 58 measured by a temperature sensor provided in the vicinity of the material heater 58.

For example, a state related to a temperature of the stage heater 222, a state related to a temperature of the upper heater 67, a state related to a remaining amount of the raw material of the molding material, and a state related to a temperature of an uppermost layer are further displayed in the second display area AR2 as the device state. The state related to the temperature of the stage heater 222 represents, for example, a temperature of the stage heater 222 measured by a temperature sensor provided in the vicinity of the stage heater 222. The state related to the temperature of the upper heater 67 represents, for example, a temperature of the upper heater 67 measured by a temperature sensor provided in the vicinity of the upper heater 67. The state related to the remaining amount of the raw material of the molding material is, for example, a value calculated by subtracting an amount corresponding to the cumulative ejection amount of the molding material from a predetermined total amount of the raw material. The state related to the temperature of the uppermost layer represents, for example, a temperature of the uppermost layer in the layers laminated on the stage 220, measured by a temperature sensor that is provided in the vicinity of the nozzle tip 60 and measures the temperature.

Figure 7:
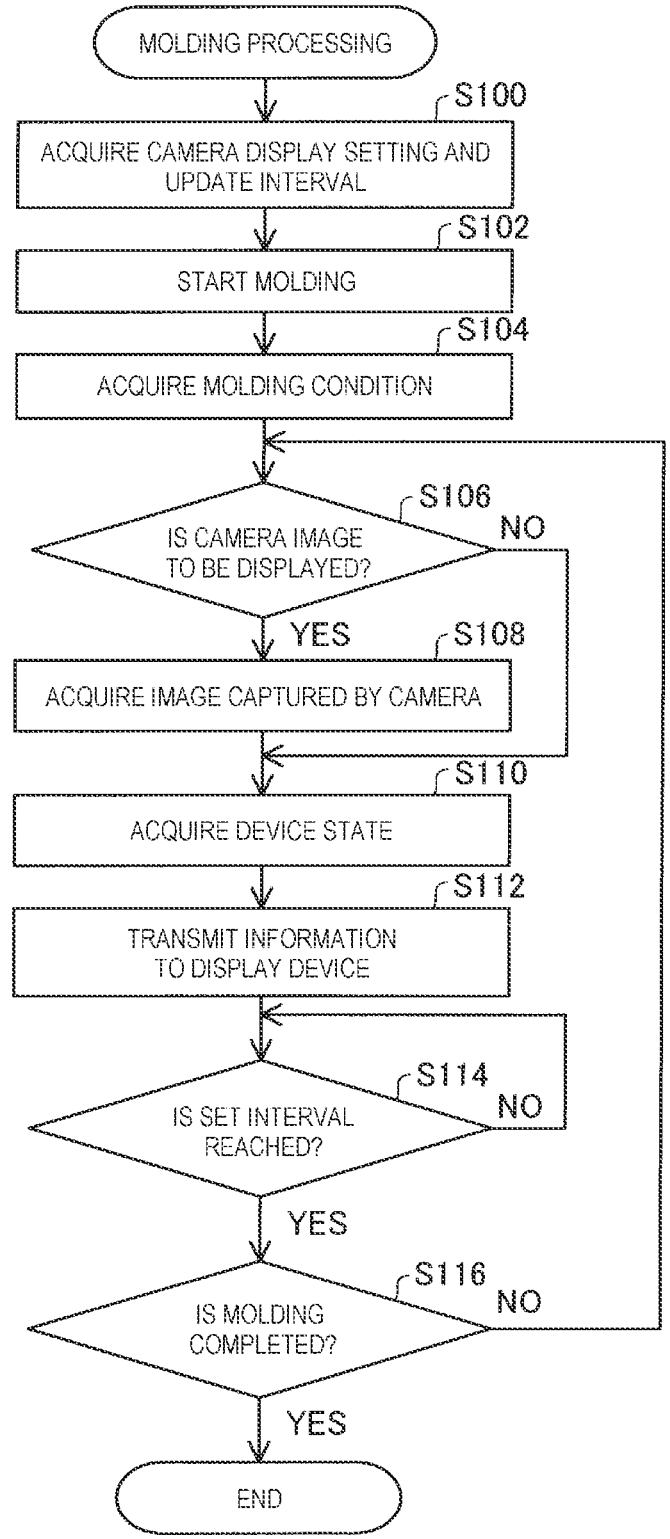
FIG. 7 is a flowchart of molding processing.

FIG. 7 is a flowchart of molding processing. This processing is for the control unit 300 to mold the three-dimensional molded object according to the molding data.

In step S100, the control unit 300 first identifies user information corresponding to molding data on a three-dimensional molded object to be molded from the setting database DB1 stored in the storage unit 330, and acquires camera display setting and an update interval corresponding to the user information.

In step S102, the control unit 300 controls the ejection unit 100 and the position changing unit 210 according to the molding data to start molding of the three-dimensional molded object.

In step S104, the control unit 300 acquires a molding condition. The molding condition is set in advance in the control unit 300 prior to execution of the molding processing. The molding condition may be recorded in the molding data.

In step S106, the control unit 300 determines whether to display a camera image based on the camera display setting acquired in step S100.

When it is determined in step S106 that the camera image is to be displayed, the control unit 300 acquires an image captured by the camera 8 in step S108. When it is determined in step S106 that the camera image is not to be displayed, the control unit 300 skips the processing in step S108.

In step S110, the control unit 300 acquires a device state using various sensors provided in the three-dimensional molding device 5.

In step S112, the control unit 300 transmits, to the display device 400, the molding condition acquired in step S104, the device state acquired in step S110, and the image acquired in step S108. In this way, a screen shown in FIG. 2 is displayed on the display unit 420 of the display device 400.

In step S114, the control unit 300 determines whether elapsed time from execution of step S106 has reached the update interval acquired in step S100. When the elapsed time from the execution of step S106 has not reached the update interval acquired in step S100, the processing in step S114 is looped, and when the elapsed time has reached the update interval, the processing proceeds to step S116.

In step S116, the control unit 300 determines whether the molding of the three-dimensional molded object is completed. When it is determined that the molding is not completed, the control unit 300 returns the processing to step S106. When it is determined that the molding is completed, the molding processing is ended.

Processing contents in a case where the control unit 300 molds one molded object have been described in the molding processing described above, but the control unit 300 can simultaneously mold a plurality of molded objects on the molding surface 221 of the stage 220. In order to switch between display and non-display of an image for each of the plurality of molded objects simultaneously molded, the control unit 300 executes obfuscation processing described in a second embodiment to be described later.

Figure 8:
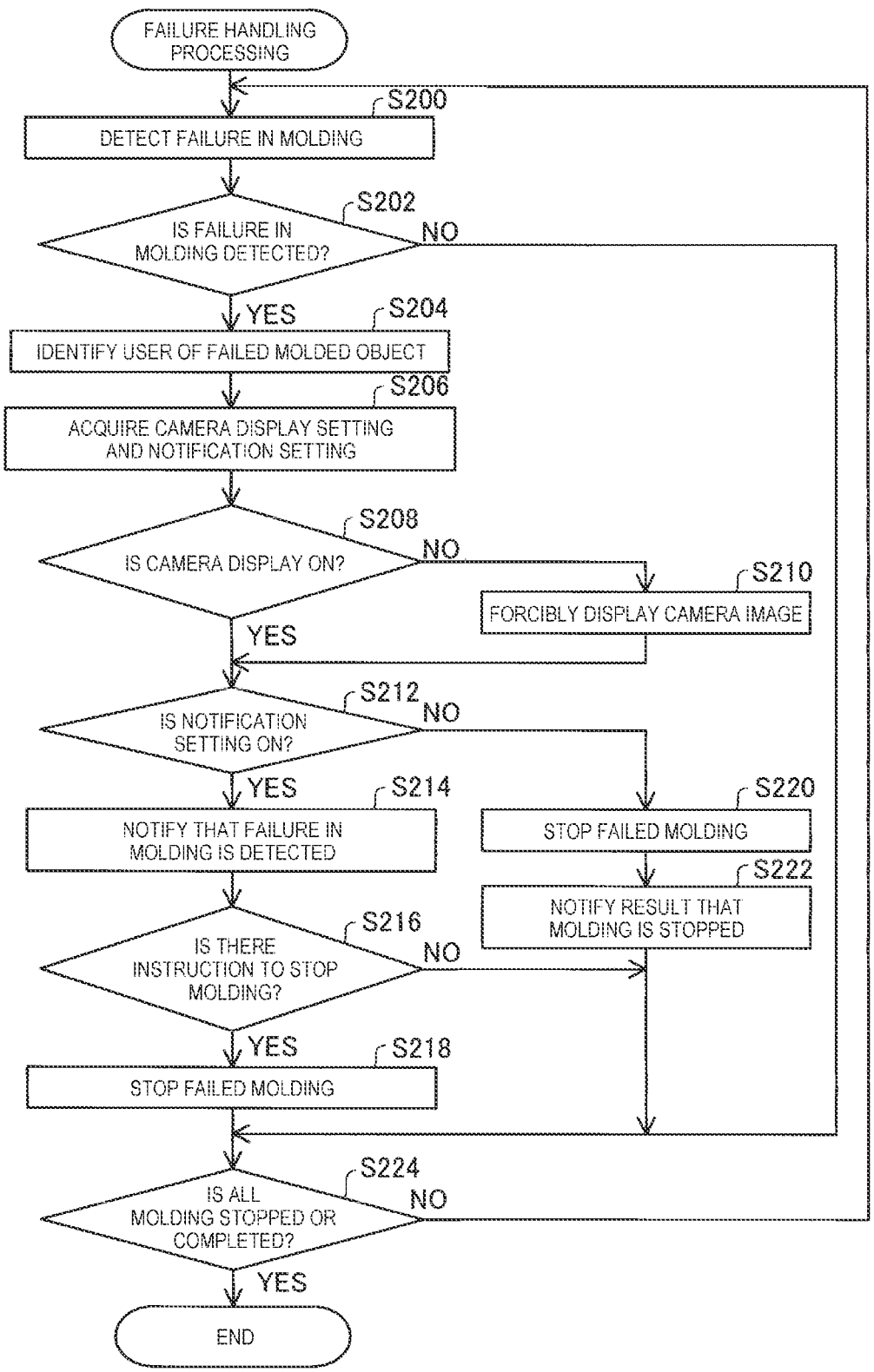
FIG. 8 is a detailed flowchart of failure handling processing.

FIG. 8 is a flowchart of failure handling processing. This processing is executed by the control unit 300 simultaneously and in parallel with the molding processing described above, and is for detecting a failure in the molding of the three-dimensional molded object and handling the failure in the molding when the failure is detected.

In step S200, first, the control unit 300 detects whether the molding fails by comparing a shape of the three-dimensional molded object captured by the camera 8 with a shape of the three-dimensional molded object based on the molding data. The shape of the three-dimensional molded object based on the molding data is a virtual shape when a three-dimensional shape formed by virtually moving the nozzle according to the molding data is imaged from the same position as the camera 8 by a virtual camera. For example, the control unit 300 uses the virtual shape as a template, compares the virtual shape with the shape of the three-dimensional molded object in the image captured by the camera 8 by a template matching method, and determines that the molding fails when a degree of similarity therebetween is lower than a predetermined threshold. In other embodiments, the control unit 300 may determine whether the molding fails based on a device state obtained from the three-dimensional molding device 5. For example, the control unit 300 can determine that the molding fails, for example, when a temperature of the uppermost layer does not reach a predetermined value or when a pressure is lower than a predetermined value.

In step S202, the control unit 300 determines whether a failure in the molding is detected in step S200. When no failure in the molding is detected, the processing is skipped up to the processing in step S224 to be described later. When detecting the failure in the molding, the control unit 300 identifies user information corresponding to molding data on a failed molded object with reference to the setting database DB1 in step S204.

In step S206, the control unit 300 acquires camera display setting and notification setting corresponding to the user information identified in step S204.

In step S208, it is determined whether the camera display setting acquired in step S206 is "ON", that is, whether an image captured by the camera 8 is set to be displayed. When it is determined that the camera display setting is not "ON", that is, "OFF", the control unit 300 forcibly displays the image captured by the camera 8 on the display unit 420 regardless of the camera display setting in step S210.

When it is determined in step S208 that the camera display setting is "ON", or when the image captured by the camera 8 is forcibly displayed on the display unit 420 in step S210, the control unit 300 subsequently determines in step S212 whether the notification setting acquired in step S206 is "ON", that is, whether the failure in the molding is set to be notified to a user.

When it is determined in step S212 that the notification setting is "ON", in step S214, the control unit 300 notifies the user identified in step S204 that the failure in the molding is detected. For example, the control unit 300 notifies the user that the molding fails by displaying a message indicating that the molding fails together with the camera image in the first display area AR1 or the second display area AR2. For example, when an e-mail address is registered in the setting database DB1 in association with the user information, an e-mail indicating that the molding fails may be transmitted to the e-mail address. At this time, the control unit 300 may attach the image of the failed molded object to the e-mail.

In step S216, the control unit 300 determines whether there is an instruction to stop the molding from the user. When the user confirms the message notified in step S214, the user can give the instruction to stop the molding by performing a predetermined operation on the display device 400 or the control unit 300.

When it is determined in step S216 that there is the instruction to stop the molding, the control unit 300 stops the molding of the failed molded object in step S218.

In step S224, the control unit 300 determines whether the molding of all the three-dimensional molded objects currently being molded is stopped or completed. When the molding of all the three-dimensional molded objects currently being molded is stopped or completed, the control unit 300 ends the failure handling processing. Alternatively, when the molding is continuously performed even for a part of the three-dimensional molded objects currently being molded, the control unit 300 returns the processing to step S200.

When it is determined in step S212 that the notification setting is not "ON", that is, when it is determined that the failure in the molding is set not to be notified to the user, the control unit 300 stops the molding of the failed molded object without notifying the user in step S220. Then, the user is notified that the molding is stopped by the same method as in step S214, and the processing proceeds to step S224 described above.

Figure 9:
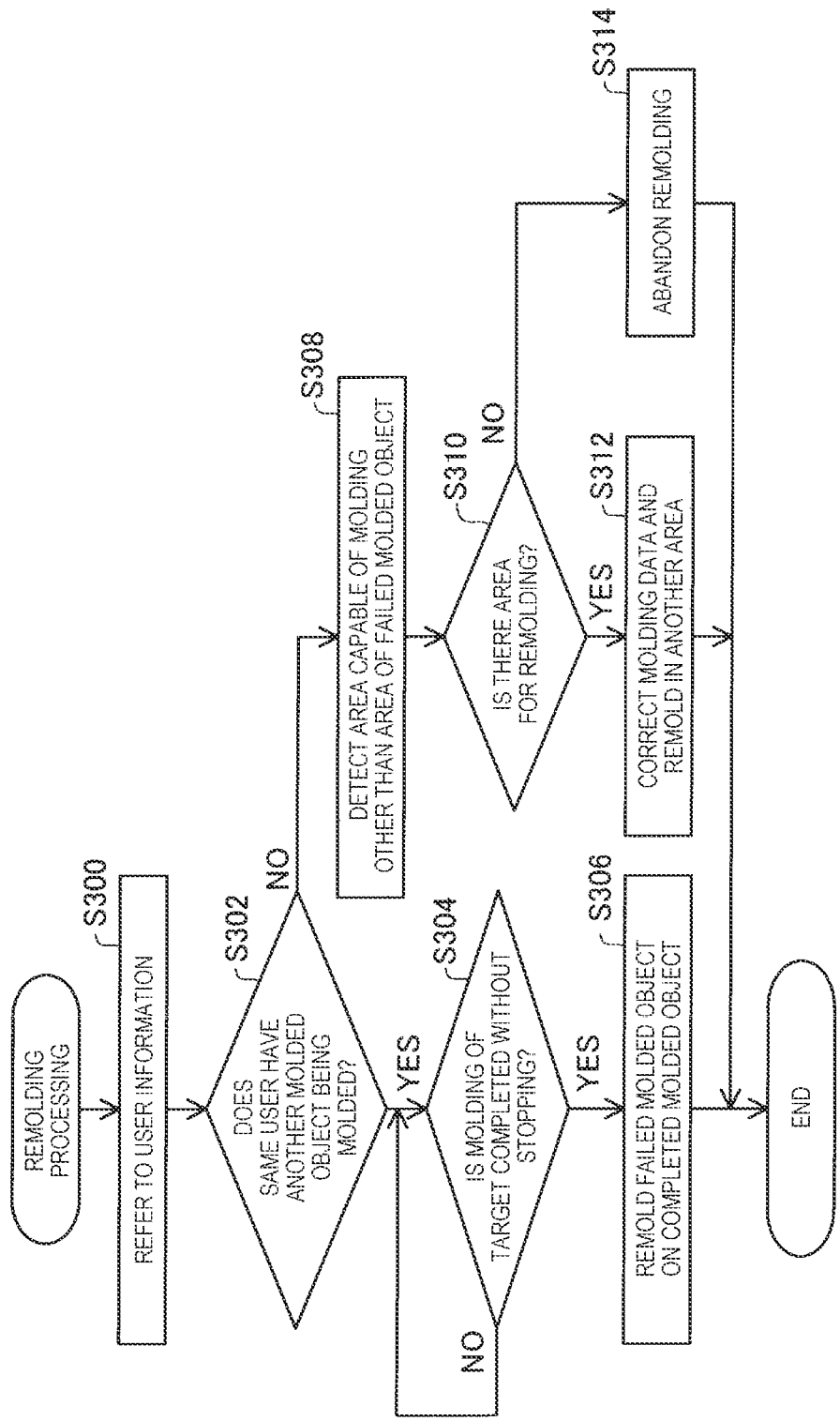
FIG. 9 is a flowchart of remolding processing.

FIG. 9 is a flowchart of remolding processing. This processing is for remolding the molded object determined to be failed, and is executed when the failed molding is stopped in step S218 or step S220 of the failure handling processing shown in FIG. 8. Whether to execute the remolding processing may be determined by receiving a predetermined instruction from the user, or may be set in association with the user information in the setting database DB1 shown in FIG. 2, for example.

The control unit 300 refers to the setting database DB1 in step S300, and determines in step S302 whether the same user as the user of the failed molded object is simultaneously molding another molded object. Hereinafter, the other molded object that is simultaneously being molded is also referred to as a target molded object.

When it is determined in step S302 that the user is simultaneously molding the other molded object, the control unit 300 determines in step S304 whether molding of the target molded object is completed without stopping. When the molded object that is the target molded object is not completed, the control unit 300 loops the processing in step S304.

When it is determined in step S304 that the molding of the target molded object is completed, that is, when it is determined that the molding of the target molded object is completed without failure, the control unit 300 remolds the molded object determined to be failed on the target molded object determined to be unfailed in step S306. At this time, the control unit 300 corrects the molding data on the failed molded object. Specifically, in the molding data on the failed molded object, X and Y coordinates of path information are corrected to positions in an area where the target molded object exists, and a Z coordinate is raised according to a height of the target molded object. In this way, the failed molded object can be molded on the target molded object. A release layer may be formed on the target molded object by a support material, and the failed molded object may be molded on the release layer.

FIG. 10 shows an example in which a user A molds two molded objects MD1, MD2 and a user B molds one molded object MD3. As shown in an upper part of FIG. 10, when molding of the molded object MD2 of the user A fails, the failed molded object MD2 is remolded on the molded object MD1 that is another molded object of the user A in step S306. In a case where a height of the failed molded object at the time of completion is added to the height of the target molded object, when the total height exceeds an upper limit of a height at which the three-dimensional molding device 5 can perform molding, the control unit 300 may abandon remolding of the failed molded object or may shift the processing to step S308 to be described later.

When it is determined in step S302 that the same user as the user of the failed molded object is not simultaneously molding another molded object, in step S308, the control unit 300 detects an area where a molded object can be molded, which is an area on the molding surface 221 other than an area of the failed molded object. This detection may be performed by analyzing the molding data, or by analyzing the image captured by the camera 8. In the subsequent step S310, the control unit 300 determines whether there is an area for remolding as a result of the detection in step S308.

When it is determined in step S310 that there is no area for remolding, the control unit 300 abandons the remolding of the failed molded object in step S314. On the other hand, when it is determined in step S310 that there is an area for remolding, in step S312, the control unit 300 corrects the molding data and molds the failed molded object in the area detected in step S308.

FIG. 11 is a diagram showing correction of the molding data in step S312. In a drawing shown in an upper part of FIG. 11, an area indicated by a broken line is an area where remolding can be performed. In the molding data on the failed molded object, the control unit 300 corrects X and Y coordinates of path information to coordinates of the area detected in step S308. In this way, the failed molded object can be remolded in the area where no other molded object is molded. In the embodiment, in the correction of the molding data, the control unit 300 corrects the molding data such that the nozzle tip 60 does not move over the area where the failed molded object is molded, as indicated by an arrow shown in a drawing shown in a lower part of FIG. 11. In this way, the nozzle tip 60 can be prevented from coming into contact with the failed molded object. The control unit 300 may correct the molding data such that the nozzle tip 60 does not move over the area where the failed molded object is molded, not only in a case where the failed molded object is to be molded in the area for remolding, but also in a case where the failed molded object is to be molded on another molded object.

In the remolding processing according to the embodiment described above, when it is determined that there is no other molded object being molded by the same user, the area where remolding can be performed is detected. Alternatively, in other embodiments, when no area for remolding is detected, it may be determined whether there is another molded object being molded by the same user. The user may select whether to perform remolding on the other molded object of the same user or to perform remolding by detecting an area where remolding can be performed, or the user may set a priority in advance.

According to the three-dimensional molding system 6 according to the embodiment described above, in the first display area AR1 of the display unit 420, a state in which an image is displayed or a state in which an image is not displayed can be selected for each three-dimensional molded object. Therefore, it is possible to provide useful information to the user by displaying the molding condition and the device state in the second display area AR2, and in the state in which the image is not displayed in the first display area AR1, it is possible to prevent leakage of information to other users in a situation where a three-dimensional molded object containing confidential information is being molded.

In the embodiment, it is determined whether the molding of the three-dimensional molded object fails based on the image captured by the camera 8. More specifically, whether the molding fails is determined by comparing the shape of the three-dimensional molded object based on the image with the shape of the three-dimensional molded object based on the molding data. Therefore, it is possible to inspect whether the molding fails using the camera 8 that captures the image.

In the embodiment, when it is determined that the molding of the three-dimensional molded object fails, the molding data is corrected such that the failed three-dimensional molded object can be remolded. Therefore, even when the molding of the three-dimensional molded object fails, the three-dimensional molded object can be remolded.

In the embodiment, since the molding data is corrected such that the failed three-dimensional molded object is remolded on the unfailed three-dimensional molded object, the failed three-dimensional molded object can be remolded even when there is no margin in area of the molding surface 221 of the stage 220.

In the embodiment, since the molding data is corrected such that the nozzle tip 60 does not move over the area where the failed three-dimensional molded object is molded, it is possible to prevent movement of the nozzle tip 60 from being hindered by the failed three-dimensional molded object.

Since the three-dimensional molding system 6 according to the embodiment includes the storage unit 330 that stores the three-dimensional molded objects and the user information in association with each other, it is possible to manage a correspondence relationship between the plurality of three-dimensional molded objects and users who intend to mold the three-dimensional molded objects.

In the embodiment, when it is determined that the molding of the three-dimensional molded object fails, information indicating that the molding fails is notified based on the user information. Therefore, for example, even when three-dimensional molded objects of a plurality of users are simultaneously molded, it is possible to appropriately notify the user of the three-dimensional molded object whose molding fails.

In the embodiment, when it is determined that the molding of the three-dimensional molded object fails, the molding data is corrected such that the failed three-dimensional molded object is molded on the unfailed three-dimensional molded object associated with user information matching user information corresponding to the failed three-dimensional molded object. Therefore, it is possible to prevent the three-dimensional molded object from being molded on a three-dimensional molded object of another user. Therefore, when the failed three-dimensional molded object is remolded, leakage of information to other users can be prevented. In other embodiments, for example, when a molded object that does not leak information is to be molded, a failed three-dimensional molded object may be molded on a three-dimensional molded object whose user information does not match.

B. Second Embodiment

Figure 12:
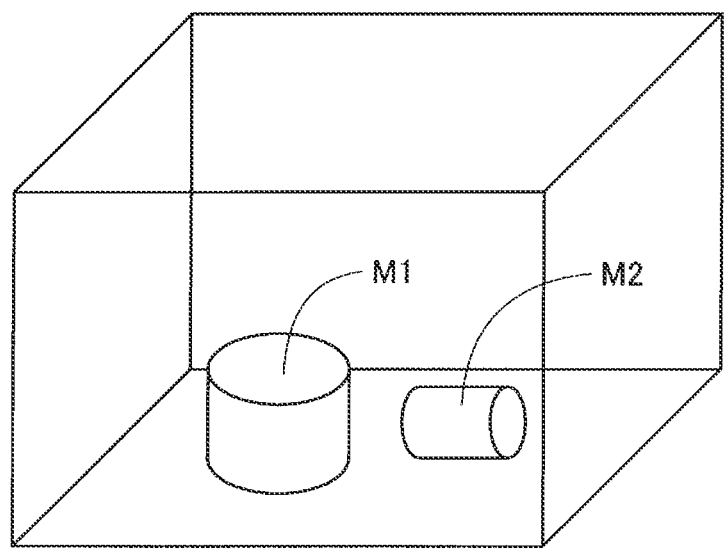
FIG. 12 is a diagram illustrating an example in which a plurality of three-dimensional molded objects are arranged on one molding surface.

FIG. 12 is a diagram illustrating an example in which a plurality of three-dimensional molded objects are arranged on one molding surface 221. As shown in FIG. 12, the three-dimensional molding device 5 according to the above embodiment can simultaneously mold the plurality of three-dimensional molded objects in parallel in one time of molding processing when molding positions of the three-dimensional molded objects in a planar direction are different. FIG. 12 shows a first molded object M1 molded by a first user and a second molded object M2 molded by a second user.

Figure 13:
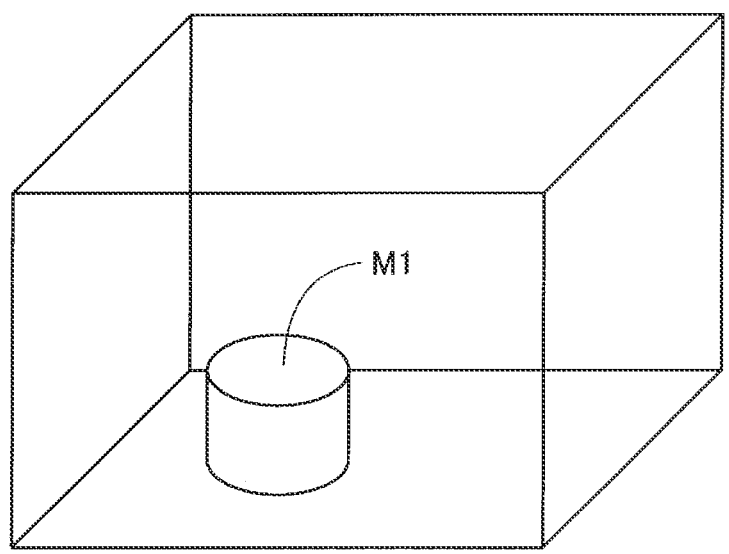
FIG. 13 is a first diagram illustrating a first display example of an image according to a second embodiment.
Figure 14:
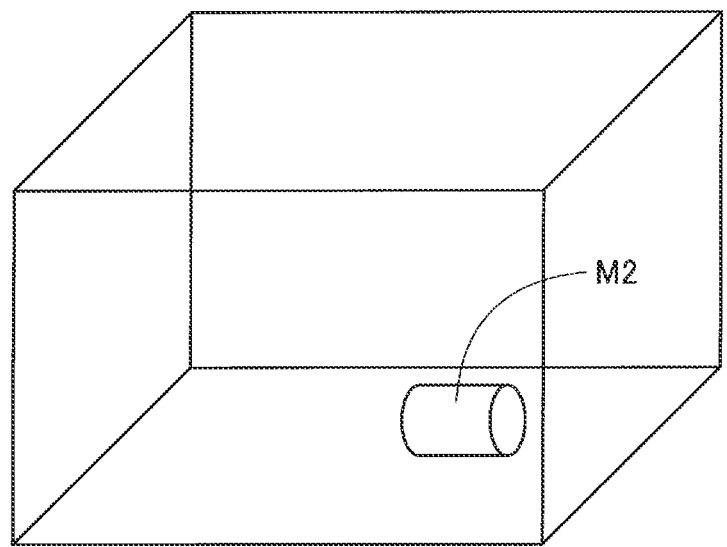
FIG. 14 is a second diagram illustrating the first display example of an image according to the second embodiment.

FIGS. 13 and 14 are diagrams illustrating first display examples of images according to a second embodiment. When user information corresponding to the first three-dimensional molded object and user information corresponding to the second three-dimensional molded object among the plurality of three-dimensional molded objects molded on the stage 220 are different from each other, the control unit 300 according to the embodiment obfuscates and displays an image of one of the first three-dimensional molded object and the second three-dimensional molded object in the first display area AR1 in a first state in which the image is displayed on the display device 400. FIG. 13 shows, as an example of the obfuscation processing, an example in which image processing, of deleting a molded object on the molding surface 221 corresponding to a user other than the first user who requests image output and displaying only the first molded object M1 of the first user, is executed. Such image processing is referred to as non-display processing. FIG. 14 shows an example in which non-display processing, of deleting a three-dimensional molded object on the molding surface 221 corresponding to a user other than the second user who requests image output and displaying only the second molded object M2 of the second user, is executed. The control unit 300 calculates an area to be obfuscated in the image based on user information, a position of the three-dimensional molded object corresponding to the user information, and an imaging direction of the camera 8.

Figure 15:
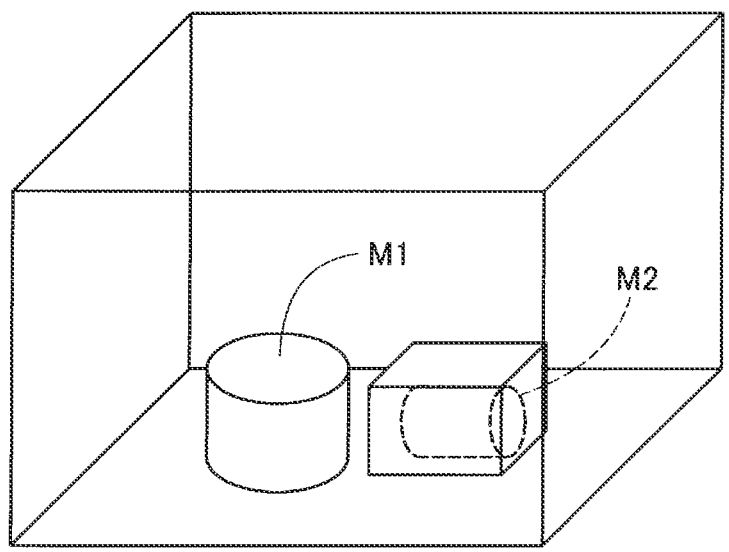
FIG. 15 is a diagram illustrating a second display example of an image according to the second embodiment.

FIG. 15 is a diagram illustrating a second display example of an image according to the second embodiment. FIG. 15 shows, as an example of the obfuscation processing, an example in which conversion processing, of converting an image of a molded object on the molding surface 221 corresponding to a user other than the first user who requests image output into an image irrelevant to the molded object, is executed. FIG. 15 shows the example in which the cylindrical second molded object M2 before obfuscation is indicated by a broken line, and a shape of the second molded object M2 is converted into a rectangular parallelepiped shape by obfuscation.

Figure 16:
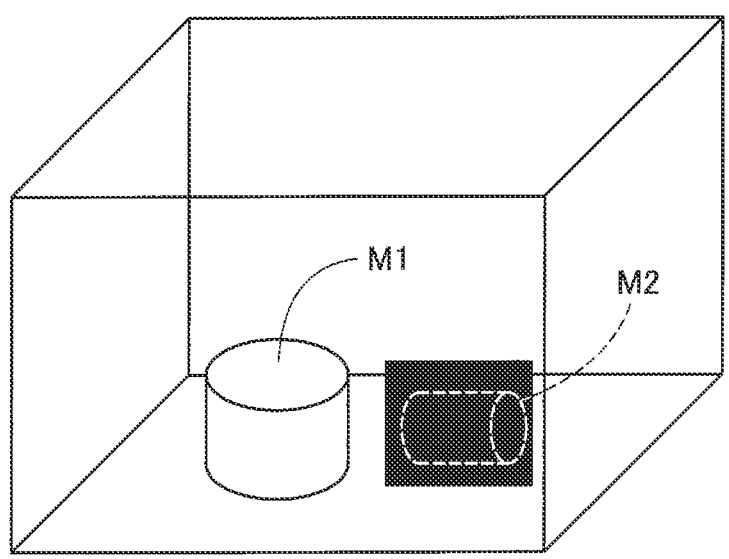
FIG. 16 is a diagram illustrating a third display example of an image according to the second embodiment.

FIG. 16 is a diagram illustrating a third display example of an image according to the second embodiment. FIG. 16 shows, as an example of the obfuscation processing, an example in which image processing, of filling a three-dimensional molded object on the molding surface 221 corresponding to a user other than the first user who requests image output with a single color, is executed. Although FIG. 16 shows an example in which the molded object is filled with the single color, the molded object may be filled with gradation or subjected to mosaic processing.

According to the second embodiment described above, when three-dimensional molded objects of a plurality of users are simultaneously molded, an image of a three-dimensional molded object of another user can be obfuscated, and thus leakage of information to other users can be prevented. Therefore, even when the three-dimensional molded objects of the plurality of users are simultaneously molded, a confidential component can be easily molded.

In the second embodiment, the control unit 300 of the three-dimensional molding device 5 executes the obfuscation processing. Alternatively, the obfuscation processing may be executed by the display device 400. In this case, the control unit 300 directly transmits an image captured by the camera 8 to the display device 400, and transmits, to the display device 400, an instruction to execute the obfuscation processing on at least one molded object among the plurality of molded objects, more specifically, an area where a three-dimensional molded object of a user other than the user who is currently using the display device 400 is imaged. In this way, when the obfuscation processing is executed by the display device 400, it is not necessary to execute the obfuscation processing for each user in the three-dimensional molding device 5, and thus it is possible to reduce a processing load of the three-dimensional molding device 5.

C. Third Embodiment

Figure 17:
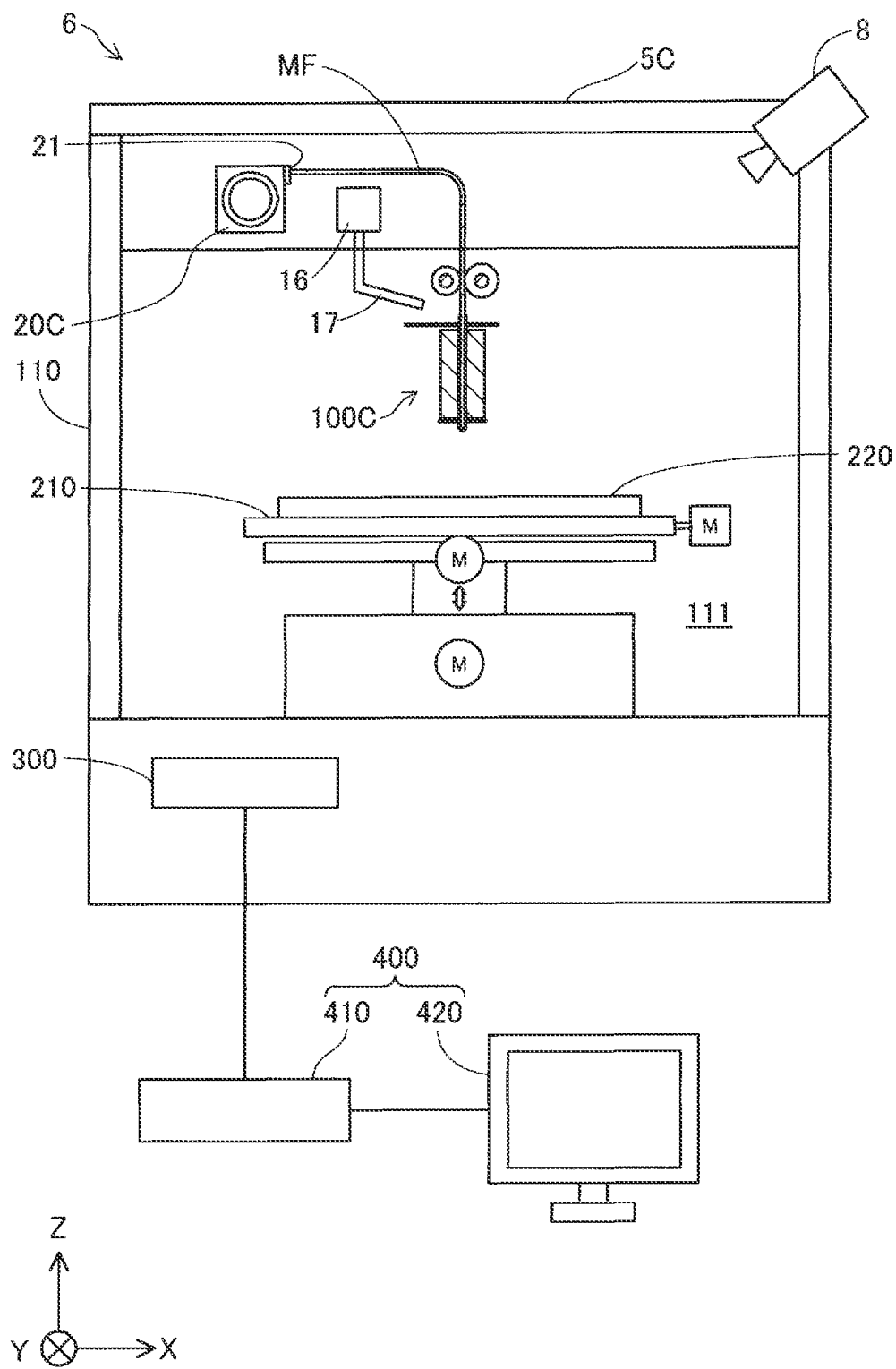
FIG. 17 is a diagram showing a schematic configuration of a three-dimensional molding device according to a third embodiment.

FIG. 17 is a diagram showing a schematic configuration of a three-dimensional molding device 5C according to a third embodiment. Similarly to the first embodiment, the three-dimensional molding device 5C according to the embodiment is a three-dimensional molding device using the material extrusion method, but a configuration of each unit is different from that of the first embodiment. In a configuration of the three-dimensional molding device 5C according to the embodiment, description of the same configuration as that of the first embodiment will be omitted.

Similarly to the first embodiment, the three-dimensional molding device 5C according to the embodiment includes an ejection unit 100C, a material accommodation unit 20C, the chamber 110, the position changing unit 210, the stage 220, the control unit 300, and the camera 8. The three-dimensional molding device 5C further includes a blower 16. The blower 16 is an air blower that blows air toward the ejection unit 100C via a manifold 17. In the embodiment, the molding space 111 in the chamber 110 accommodates a portion of the manifold 17, the ejection unit 100C, the position changing unit 210, and the stage 220.

The material accommodation unit 20C according to the embodiment serves as a holder that accommodates a filamentary material MF. The material accommodation unit 20C includes an outlet portion 21. The material accommodation unit 20C allows the material MF accommodated therein to be unwound to the outside of the material accommodation unit 20C via the outlet portion 21.

Figure 18:
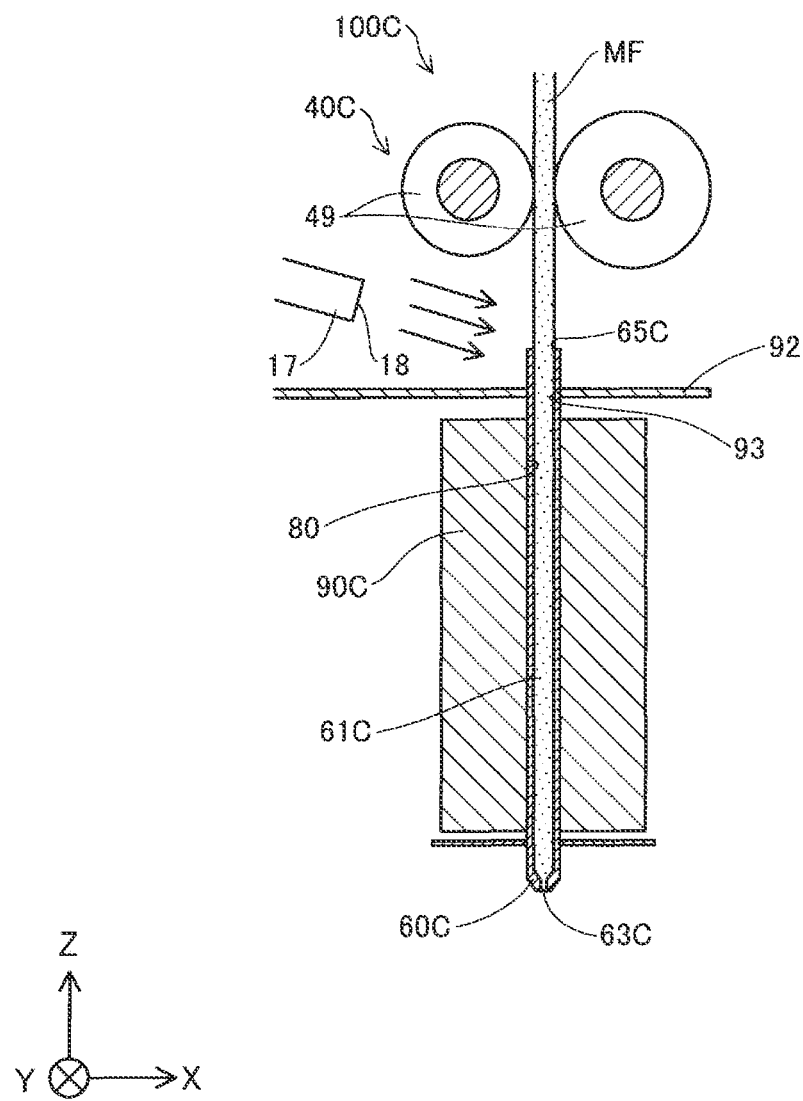
FIG. 18 is a diagram showing a schematic configuration of an ejection unit according to the third embodiment.

FIG. 18 is a diagram showing a schematic configuration of the ejection unit 100C according to the embodiment. The ejection unit 100C includes a heating block 90C including a heater and having a through hole 80, a nozzle tip 60C detachably attached to the through hole 80, and a material conveyance mechanism 40C that conveys the material toward a nozzle flow path 61C of the nozzle tip 60C attached to the heating block 90C. The ejection unit 100C further includes a heat shield 92 that is disposed between the material conveyance mechanism 40C and the heating block 90C in the Z direction and prevents heat transfer from the heating block 90C to the material conveyance mechanism 40C. Different from the first embodiment, the material conveyance mechanism 40C according to the embodiment is implemented by two wheels 49 instead of the screw case 31 and the screw 41. Different from the first embodiment, the heating block 90C does not include the barrel 50 and the case portion 91.

The nozzle tip 60C according to the embodiment is attached to the heating block 90C by being inserted into the through hole 80 and a shield opening 93 formed in the heat shield 92 from a −Z direction. That is, in the embodiment, a dimension of the nozzle tip 60C along the Z direction and a dimension of the nozzle flow path 61C along the Z direction are longer than a dimension of the through hole 80 along the Z direction. Therefore, in the embodiment, an inflow port 65C provided at a rear end of the nozzle tip 60C is located in a +Z direction of the heating block 90C, more specifically, in a +Z direction of the heat shield 92.

By rotation of the two wheels 49 forming the material conveyance mechanism 40C, the material MF in the material accommodation unit 20C is drawn out to the outside and guided between the two wheels 49, and is conveyed toward the nozzle flow path 61C of the nozzle tip 60C attached to the through hole 80 of the heating block 90C. The heating block 90C plasticizes the material MF conveyed into the nozzle flow path 61C of the nozzle tip 60C by heat of the heater (not shown) built in the heating block 90C.

The material MF according to the embodiment is cooled in the vicinity of the inflow port 65C of the nozzle tip 60C by the air sent from the blower 16 via the manifold 17. Accordingly, plasticization of the material MF in the vicinity of the inflow port 65C is inhibited, and the material MF is efficiently conveyed into the inflow port 65C. An outlet end 18 of the manifold 17 is located in the +Z direction of the heat shield 92. Accordingly, the air sent out from the manifold 17 is easily guided to the vicinity of the inflow port 65C by the heat shield 92, and thus the material MF in the vicinity of the inflow port 65C is efficiently cooled.

The three-dimensional molding device 5C according to the third embodiment described above can also mold a three-dimensional molded object in the same manner as the three-dimensional molding device 5 according to the first embodiment.

D. Other Embodiments (D1) In the above embodiments, the control unit 300 switches display of an image on the display device 400 by switching between transmission and non-transmission of the image to the display device 400, and the image is captured by the camera 8 that is constantly started. Alternatively, instead of constantly starting the camera 8, the control unit 300 may switch the display of the camera image between on and off by starting or stopping the camera 8 based on setting information.

For example, the control unit 300 may constantly transmit, to the display device 400, the image captured by the camera 8 in a constantly started state, and the control unit 300 may execute processing of transmitting, to the display device 400, output instruction information for instructing whether to display the image based on the setting information. In this way, the display device 400 can switch whether to display the constantly received image captured by the camera 8 based on the output instruction information.

(D2) In the above embodiments, the control unit 300 executes both the failure handling processing shown in FIG. 8 and the remolding processing shown in FIG. 9. Alternatively, the control unit 300 may execute the failure handling processing and may not execute the remolding processing. The control unit 300 may not execute both the failure handling processing and the remolding processing.

(D3) In the above embodiments, the display unit 420 is controlled by the computer 410. Alternatively, the display unit 420 may be controlled by the control unit 300. The display unit 420 may be provided in the three-dimensional molding device 5.

E. Other Aspects

The present disclosure is not limited to the embodiments described above, and can be implemented in various forms without departing from the scope of the present disclosure.

For example, the present disclosure can be implemented in the following aspects. In order to solve a part of or all of problems of the present disclosure, or to achieve a part of or all of effects of the present disclosure, technical features of the above embodiments corresponding to technical features of the following aspects can be replaced or combined as appropriate. The technical features can be deleted as appropriate unless described as essential in the present specification.

(1) According to a first aspect of the present disclosure, a three-dimensional molding system is provided. The three-dimensional molding system includes: an ejection unit including a nozzle configured to eject a molding material; a stage including a molding surface and on which the molding material is laminated; a position changing unit configured to change relative positions of the stage and the nozzle; a camera disposed outside an outer edge of the molding surface when viewed from a direction perpendicular to the molding surface, and at a position where the entire molding surface is imaged; a control unit configured to mold a three-dimensional molded object by controlling the ejection unit and the position changing unit based on molding data; and a display unit including a first display area configured to display an image or a moving image captured by the camera, and a second display area configured to display at least one of a molding condition for molding the three-dimensional molded object and a device state representing a state of the ejection unit during molding of the three-dimensional molded object. The control unit selects, for each three-dimensional molded object, one of a first state in which the image or the moving image is displayed in the first display area and a second state in which the image or the moving image is not displayed in the first display area.

According to such an aspect, in the first display area of the display unit, the state in which the image or the moving image is displayed and the state in which the image or the moving image is not displayed can be selected for each three-dimensional molded object. Therefore, it is possible to provide useful information to a user by displaying the molding condition and the device state in the second display area, and it is possible to prevent leakage of information to other users in the state in which the image or the moving image of the three-dimensional molded object is not displayed in the first display area.

(2) In the three-dimensional molding system according to the above aspect, the molding condition may include at least one of a condition related to the molding material to be ejected by the ejection unit, a condition related to a temperature of a material heater provided in the ejection unit, a condition related to a temperature of a stage heater provided in the stage, and a condition related to a temperature of an upper heater disposed above an opening of the nozzle and configured to heat the molding material.

(3) In the three-dimensional molding system according to the above aspect, the device state may include a state related to a cumulative ejection amount of the ejection unit or a state related to a temperature of a material heater provided in the ejection unit, and the device state may further include at least one of a state related to a temperature of a stage heater provided in the stage, a state related to a temperature of an upper heater disposed above an opening of the nozzle and configured to heat the molding material, a state related to a remaining amount of a raw material of the molding material, and a state related to a temperature of an uppermost layer during molding laminated on the stage.

(4) In the three-dimensional molding system according to the above aspect, the control unit may determine whether molding of the three-dimensional molded object fails based on the image, the moving image, or the device state.

(5) In the three-dimensional molding system according to the above aspect, the control unit may determine whether the molding fails by comparing a shape of the three-dimensional molded object based on the image or the moving image with a shape of the three-dimensional molded object based on the molding data. According to such an aspect, it is possible to determine whether the molding fails using the image or the moving image captured by the camera.

(6) In the three-dimensional molding system according to the above aspect, when determining that the molding of the three-dimensional molded object fails, the control unit may correct the molding data such that the three-dimensional molded object determined to be failed is remolded. According to such an aspect, even when the molding of the three-dimensional molded object fails, the three-dimensional molded object can be remolded.

(7) In the three-dimensional molding system according to the above aspect, the control unit may mold a plurality of the three-dimensional molded objects on the stage, and the control unit may correct the molding data such that the three-dimensional molded object determined to be failed is remolded on the three-dimensional molded object determined to be unfailed. According to such an aspect, the failed three-dimensional molded object can be remolded even when there is no margin in area of the molding surface of the stage.

(8) In the three-dimensional molding system according to the above aspect, the control unit may mold a plurality of the three-dimensional molded objects on the stage, and the control unit may correct the molding data such that the nozzle does not move on an area where the three-dimensional molded object determined to be failed is molded. According to such an aspect, it is possible to prevent movement of the nozzle from being hindered by the failed three-dimensional molded object.

(9) In the three-dimensional molding system according to the above aspect, the control unit may mold a plurality of the three-dimensional molded objects on the stage, and include a storage unit configured to store the three-dimensional molded objects and user information in association with each other. According to such an aspect, it is possible to manage a correspondence relationship between the plurality of three-dimensional molded objects and users who intend to mold the three-dimensional molded objects.

(10) In the three-dimensional molding system according to the above aspect, when determining that the molding of the three-dimensional molded object fails, the control unit may notify information indicating that the molding fails based on the user information. According to such an aspect, for example, even when three-dimensional molded objects of a plurality of users are simultaneously molded, it is possible to appropriately notify the user of the three-dimensional molded object whose molding fails.

(11) In the three-dimensional molding system according to the above aspect, when determining that the molding of the three-dimensional molded object fails, the control unit may correct the molding data such that the three-dimensional molded object determined to be failed is molded on the three-dimensional molded object determined to be unfailed and matching the user information corresponding to the three-dimensional molded object determined to be failed. According to such an aspect, it is possible to prevent the three-dimensional molded object from being formed above a three-dimensional molded object of another user.

Therefore, when the failed three-dimensional molded object is remolded, leakage of information to other users can be prevented.

(12) In the three-dimensional molding system according to the above aspect, when the user information corresponding to a first three-dimensional molded object among the plurality of three-dimensional molded objects is different from the user information corresponding to a second three-dimensional molded object among the plurality of three-dimensional molded objects, the control unit may obfuscate and display an image or a moving image of one of the first three-dimensional molded object and the second three-dimensional molded object in the first display area in the first state. According to such an aspect, even when the plurality of three-dimensional molded objects are displayed in the first display area, leakage of information to other users can be prevented.

The present disclosure is not limited to the aspects of the three-dimensional molding system described above, and can be implemented in various aspects such as a three-dimensional molding device, a three-dimensional molding method, a computer program for controlling the three-dimensional molding device, and a recording medium in which the computer program is recorded so as to be readable by a computer.

What is claimed is:

1. A three-dimensional molding system comprising:
    an ejection unit including a nozzle configured to eject a molding material;
    a stage including a molding surface and on which the molding material is laminated;
    a position changing unit including three motors configured to change relative positions of the stage and the nozzle;
    a camera disposed outside an outer edge of the molding surface when viewed from a direction perpendicular to the molding surface, and at a position where the entire molding surface is imaged;
    a processor configured to mold a three-dimensional molded object on the stage by controlling the ejection unit and the position changing unit based on molding data; and
    a display unit including a first display area configured to display an image or a moving image captured by the camera, and a second display area configured to display at least one of a molding condition for molding the three-dimensional molded object and a device state representing a state of the ejection unit during molding of the three-dimensional molded object, wherein
    the processor selects, for the three-dimensional molded object, one of a first state in which the image or the moving image is displayed in the first display area and a second state in which the image or the moving image is not displayed in the first display area,
    the processor determines whether the molding of the three-dimensional molded object on the stage fails based on the image, the moving image, or the device state, and
    upon determining that the molding of the three-dimensional molded object on the stage fails, the processor corrects the molding data such that
        the three-dimensional molded object is remolded on the stage, and
        the nozzle does not move on an area of the stage where the three-dimensional molded object has been molded, during movement of the nozzle toward an area of the stage where the three-dimensional molded object is to be remolded after the molding of the three-dimensional molded object is determined to be failed.

2. The three-dimensional molding system according to claim 1, wherein
    the molding condition includes at least one of
        a condition related to the molding material to be ejected by the ejection unit,
        a condition related to a temperature of a material heater provided in the ejection unit,
        a condition related to a temperature of a stage heater provided in the stage, and
        a condition related to a temperature of an upper heater disposed above an opening of the nozzle and configured to heat the molding material.

3. The three-dimensional molding system according to claim 1, wherein
    the device state includes a state related to a cumulative ejection amount of the ejection unit or a state related to a temperature of a material heater provided in the ejection unit, and
    the device state further includes at least one of
        a state related to a temperature of an upper heater disposed above an opening of the nozzle and configured to heat the molding material,
        a state related to a remaining amount of a raw material of the molding material, and
        a state related to a temperature of an uppermost layer during molding laminated on the stage.

4. The three-dimensional molding system according to claim 1, wherein
    the processor determines whether the molding of the three-dimensional molded object fails by comparing a shape of the three-dimensional molded object based on the image or the moving image with a shape of the three-dimensional molded object based on the molding data.

5. The three-dimensional molding system according to claim 1, wherein
    the processor molds, on the stage, a plurality of three-dimensional molded objects that include the three-dimensional molded object,
    the processor determines whether molding of each of the plurality of three-dimensional molded objects on the stage fails, based on each image or moving image captured for each of the plurality of three-dimensional molded objects, or based on each device state representing each state of the ejection unit during the molding of each of the plurality of three-dimensional molded objects, and
    upon determining that molding of one of the plurality of three-dimensional molded objects fails and determining that molding of a different one of the plurality of three-dimensional molded objects does not fail, the processor corrects the molding data such that the one of the plurality of three-dimensional molded objects is remolded on the different one of the plurality of three-dimensional molded objects.

6. The three-dimensional molding system according to claim 1, wherein
    the processor molds, on the stage, a plurality of three-dimensional molded objects that include the three-dimensional molded object
    the processor determines whether molding of each of the plurality of three-dimensional molded objects on the stage fails, based on each image or moving image captured for each of the plurality of three-dimensional molded objects, or based on each device state representing each state of the ejection unit during the molding of each of the plurality of three-dimensional molded objects, and upon determining that molding of one of the plurality of three-dimensional molded objects fails and determining that molding of a different one of the plurality of three-dimensional molded objects does not fail, the processor corrects the molding data such that the nozzle does not move on the area where the one of the plurality of three-dimensional molded objects has been molded, during movement of the nozzle from an area of the stage where the different one of the plurality of three-dimensional molded objects has been molded to the area of the stage where the one of the plurality of three-dimensional molded objects is to be remolded.

7. The three-dimensional molding system according to claim 1, further comprising acquiring a camera display setting indicating whether the image or the moving image is displayed in the first display area, wherein upon determining that the molding of the three-dimensional molded object on the stage fails, the processor selects the first state and forcibly displays the image or the moving image in the first display area regardless of the camera display setting.

8. The three-dimensional molding system according to claim 1, wherein the processor molds, on the stage, a plurality of three-dimensional molded objects that include the three-dimensional molded object, and the three-dimensional molding system further comprises an auxiliary storage configured to store information about the plurality of three-dimensional molded objects and associated user information.

9. The three-dimensional molding system according to claim 8, wherein upon determining that the molding of the three-dimensional molded object fails, the processor notifies information indicating that the molding of the three-dimensional molded object fails based on the user information.

10. The three-dimensional molding system according to claim 8, wherein the processor determines whether molding of each of the plurality of three-dimensional molded objects on the stage fails, based on each image or moving image captured for each of the plurality of three-dimensional molded objects, or based on each device state representing each state of the ejection unit during the molding of each of the plurality of three-dimensional molded objects, and upon determining that molding of one of the plurality of the three-dimensional molded objects fails and determining that molding of a different one of the plurality of three-dimensional molded objects does not fail, the processor corrects the molding data such that the one of the plurality of three-dimensional molded objects is remolded on the different one of the plurality of three-dimensional molded objects which has user information matching the user information corresponding to the one of the plurality of three-dimensional molded objects determined to be failed.

11. The three-dimensional molding system according to claim 8, wherein when the user information corresponding to a first three-dimensional molded object among the plurality of three-dimensional molded objects is different from the user information corresponding to a second three-dimensional molded object among the plurality of three-dimensional molded objects, the processor obfuscates and displays an image or a moving image of one of the first three-dimensional molded object and the second three-dimensional molded object in the first display area in the first state.

* * * * *